United States Patent [19]
Gove

[11] Patent Number: 5,646,640
[45] Date of Patent: Jul. 8, 1997

[54] METHOD FOR SIMULATING VIEWS OF A SCENE USING EXPANDED PIXEL DATA TO REDUCE THE AMOUNT OF PIXEL DATA RECALCULATIONS

[75] Inventor: Robert J. Gove, Los Gatos, Calif.

[73] Assignee: Texas Instruments Incorporated, Dallas, Tex.

[21] Appl. No.: 382,274

[22] Filed: Jan. 31, 1995

[51] Int. Cl.$^6$ .............................. H04N 7/18; G09B 9/08
[52] U.S. Cl. .............................. 345/8; 348/123; 434/38
[58] Field of Search .................. 345/8, 7, 112; 348/121, 51, 169, 77, 78, 123; 33/366; 434/38

[56] References Cited

U.S. PATENT DOCUMENTS

| | | | |
|---|---|---|---|
| 4,884,219 | 11/1989 | Waldren | 345/8 |
| 4,922,336 | 5/1990 | Morton | 348/51 |
| 5,177,872 | 1/1993 | Lewis et al. | 33/366 |
| 5,281,960 | 1/1994 | Dwyer, III | 345/8 |
| 5,322,441 | 6/1994 | Lewis | 345/8 |
| 5,383,990 | 1/1995 | Beckman | 345/8 |

OTHER PUBLICATIONS

Robert J. Cove, "The MVP: A Highly-Integrated Video Compression Chip," *IEEE Data Compression Conference*, Snowbird, Utah, Mar. 28–31, 1994, pp. 1–11.

Woobin Lee, Yongmin Kim, Jeremiah Golston, and Robert J. Gove, "Real-Time MPEG Video Codec On A Single-Chip Multiprocessor," *SPIE Electronic Imaging*, San Jose, California, Feb. 6–10, 1994; May 2, 1994, pp. 1–12.

Robert J. Gove, "The MVP: A Single-Chip Multiprocessor For Image & Video Applications," *Society for Information Display 1994 International Symposium, Seminar, Exhibition*, San Jose, California, Jun. 12–17, 1994, pp. 1–5; *Digest of Technical Papers*, vol. 25, pp. 637–641.

Robert J. Gove, "Architectures for Singel-Chip Image Computing," *SPIE's Electronic Imaging Science & Technology Conference on Image Processing and Interchange*, San Jose, CA, Apr. 23, 1992, pp. 1–12.

Karl Guttag, Jerry R. Van Aken, and Robert J. Gove, "A Single-Chip Multiprocessor for Multimedia: The MVP," *IEEE Computer Graphics & Applications*, Nov., 1992, pp. 52–64.

Woobin Lee, Yongmin Kim, and Robert J. Gove, "Real-Time MPEG Video Compression Using the MVP," *IEEE Data Compression Conference*, Snowbird, Utah, Mar. 28–31, 1994, pp. 1–2, not published.

*Primary Examiner*—Victor R. Kostak
*Attorney, Agent, or Firm*—Jacqueline J. Garner; W. James Brady, III; Richard L. Donaldson

[57] ABSTRACT

A device (10) simulates a user's view (12) of a scene (16) on a display (24). A memory (36) stores region pixel data that represent a region (14) of the scene (16). A sensor (20) provides information that represents the direction and orientation of the user's gaze. A processor (32) determines the coordinates of the view (12) from the direction and orientation information, determines which of the region pixel data represent the view (12), and provides the determined view pixel data to the display (24).

11 Claims, 4 Drawing Sheets

METHOD FOR SIMULATING VIEWS OF A SCENE USING EXPANDED PIXEL DATA TO REDUCE THE AMOUNT OF PIXEL DATA RECALCULATIONS

TECHNICAL FIELD OF THE INVENTION

The present invention relates generally to electronic devices and more specifically to a device for simulating a user's view of a scene.

BACKGROUND OF THE INVENTION

A virtual-reality display system such as a pilot trainer provides a user with a simulated window (i.e., view) of a scene, such as a flight path. Typically, a memory stores data that describes the scene and the objects therein, and a sensor provides the direction and orientation of the user's gaze relative to the scene. In response to the sensor data, a processor generates view pixel data from the scene data. A display device converts the view pixel data into visible pixels that compose the view.

As the user changes the direction or orientation of her gaze, the display system attempts to update the view quickly enough to simulate in real time the transition from one view to another. Many techniques exist for such updating. For example, using one updating technique called graceful degradation, the system constructs the new view from the outlines of the largest objects to the narrowest details. Specifically, the system may first generate the outline of a building, then the outline of the windows, and finally the building's color and texture. Using another updating technique, the system first constructs the objects directly in the user's line of sight, and then constructs the objects in the periphery of the user's view.

However, because of the complex calculations and high frame rates often required to simulate such a view, systems often lack the processing speed to realistically transition from one view to another. Thus, during the view transitions generated by the above and other techniques, the user may perceive the view as animated or otherwise unnatural.

SUMMARY OF THE INVENTION

One aspect of the invention is a device for simulating a user's view of a scene on a display. A memory stores region pixel data that represent a region of the scene. A sensor provides the direction and orientation of the user's gaze. A processor determines the coordinates of the view from the direction and orientation information, determines which of the region pixel data represent the view, and provides the determined view pixel data to the display.

An advantage provided by this aspect of the invention is that a virtual-reality display system can update the user's view rapidly enough to realistically transition from one view to another.

DETAILED DESCRIPTION OF THE INVENTION

The preferred embodiment of the present invention and its advantages are best understood by referring to FIGS. 1–6 of the drawings, like numerals being used for like and corresponding parts of the various drawings.

Figure 1:
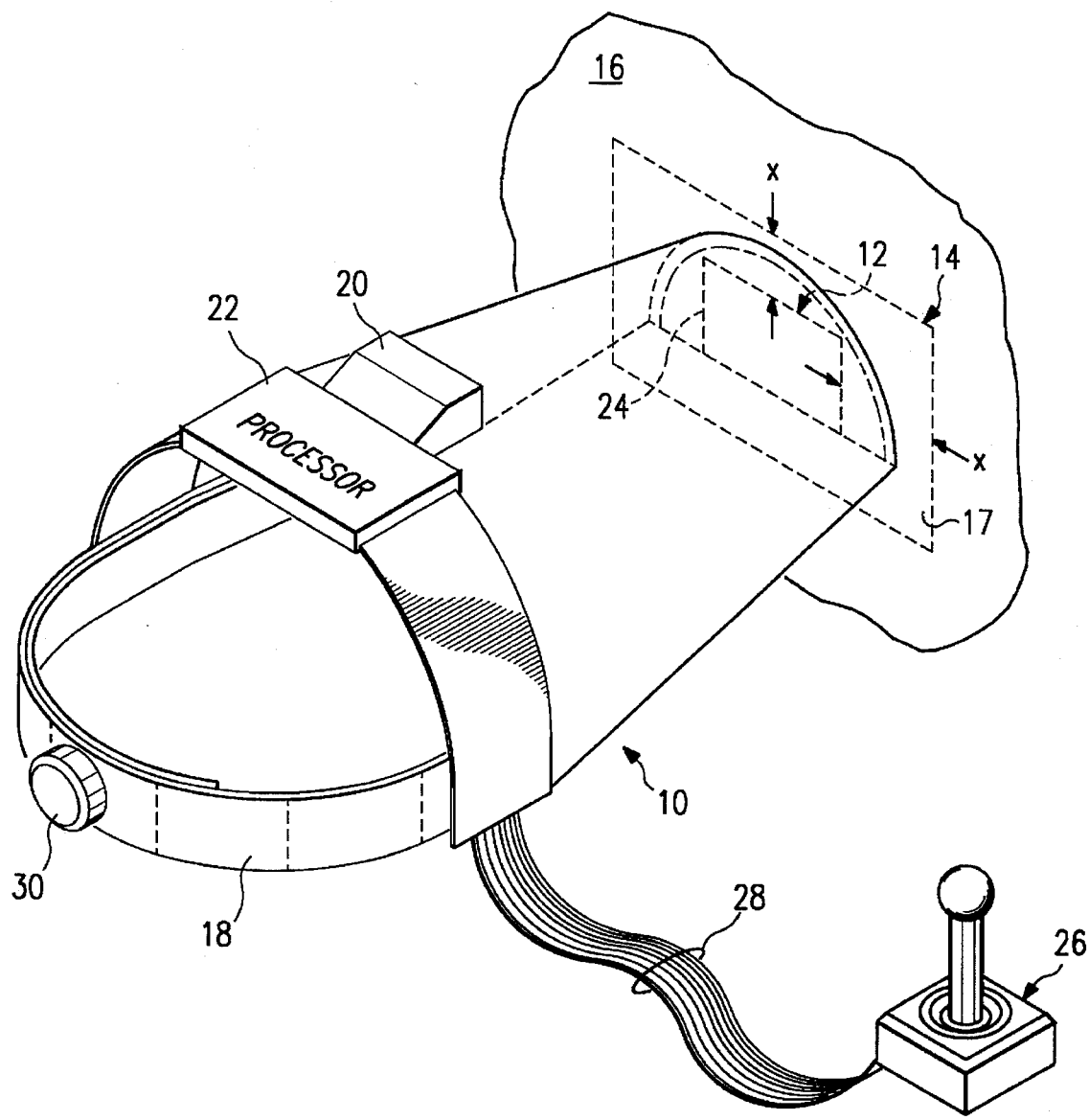
FIG. 1 is a perspective view of a virtual-reality display system, according to a preferred embodiment of the present invention.

FIG. 1 illustrates a virtual-reality display system 10, which provides a user (not explicitly shown) with a view 12 of a scene 16. Scene 16 is typically a simulated 3-dimensional space within which the user directs her gaze. Thus, view 12 simulates a movable window through which the user views sections of scene 16. View 12 is typically located within a view-buffer region 14, which encompasses a portion of scene 16 that system 10 stores and maintains in displayable form. Thus, for gaze shifts within region 14, system 10 can update view 12 without time consuming calculations and thus can provide to the user a realistic view transition unavailable with existing devices.

System 10 may include a head band 18 for fastening system 10 to the user's head. A sensor 20 provides information representing the direction and orientation of the user's gaze, or data from which this information can be calculated. An example of such a sensor is disclosed in U.S. Pat. No. 5,177,872, entitled "Method and Apparatus for Monitoring Physical Positioning of a User", assigned to Texas Instruments Incorporated of Dallas, Tex., which is incorporated by reference herein for all purposes. In response to a signal from sensor 20, processing circuitry 22 provides pixel data to a display screen 24, which converts this pixel data into the pixels that compose view 12. Screen 24 may be any suitable display device such as a cathode ray tube (CRT), a Liquid Crystal Display (LCD), or a digital mirror device (DMD). System 10 may also include a joystick controller 26 coupled to processing circuitry 22 via a ribbon cable 28. Joystick 26 allows the user to shift the direction and orientation of her gaze without moving her head. Headband 18 may include speakers (not shown) driven by circuitry 22 for providing sound that accompanies view 12. An example of such a sound system is disclosed in U.S. patent application Ser. No. 07/593,702, entitled "Method and Apparatus for Presentation of On-Line Directional Sound," filed on Oct. 5, 1990, and assigned to Texas Instruments Incorporated of Dallas, Tex., which is incorporated by reference herein for all purposes. A control 30 may be included to adjust the volume of this sound. Although it is described in a preferred embodiment for wearing on the user's head, system 10 may take other forms, such as, for example, a flight simulator having a movable chair and view screen.

For shifts of the user's gaze where part or all of view 12 remains within region 14, processing circuitry 22 updates view 12 on screen 24 to provide a realistic (i.e., nondelayed) view transition. Processing circuitry 22 stores and maintains current pixel data in a memory (described below with respect to FIG. 3) that represents the sections of scene 16 within region 14, which typically surrounds view 12 with a border 17 of width X. Researchers have found that a majority of a user's gaze shifts are relatively slight. Thus, by making the magnitude of width X large enough to accommodate such gaze shifts, circuitry 22 can quickly update view 12 for most gaze shifts by providing display 24 with pixel data that is readily available from the memory. Because processing circuitry 22 need not calculate new view pixel data, there is little or no view-updating delay, and the user perceives the transition from one view to another as realistic. After updating view 12, circuitry 22 reconstructs border 17 to recenter view 12 within region 14. As discussed in more detail below, after such recentering view 12 and region 14 typically share a common center, but may not share a common orientation.

Figure 2:
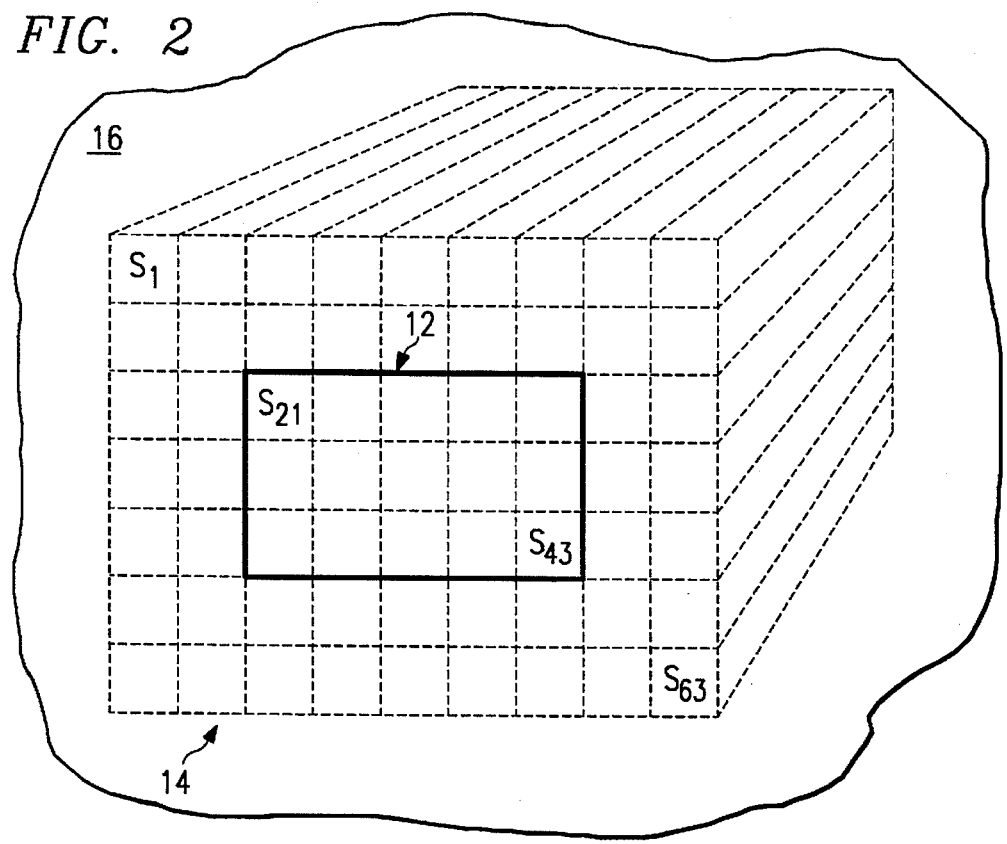
FIG. 2 is a perspective view of a simulated view and region of a scene.

FIG. 2 is a perspective view of view 12 and region 14 of scene 16. As shown, region 14 comprises three-dimensional segments S1–S63, each of which has a square cross-section. Each segment S contains a different section of scene 16. At any time, the scene section that a segment S contains depends upon the location of region 14 within scene 16. As discussed below in conjunction with FIG. 3, the pixel data that represent a scene section contained within a segment S are stored in a separate memory buffer. When the orientation of view 12 is equivalent to that of region 14, view 12 typically comprises S21–S25, S30–S34, and S39–S43 such that it is centered within region 14. Although view 12 and region 14 are shown respectively comprising fifteen and sixty three segments S having square cross-sections, more or less segments and cross-sections of other shapes are contemplated as coming within the scope of the present invention.

Figure 3:
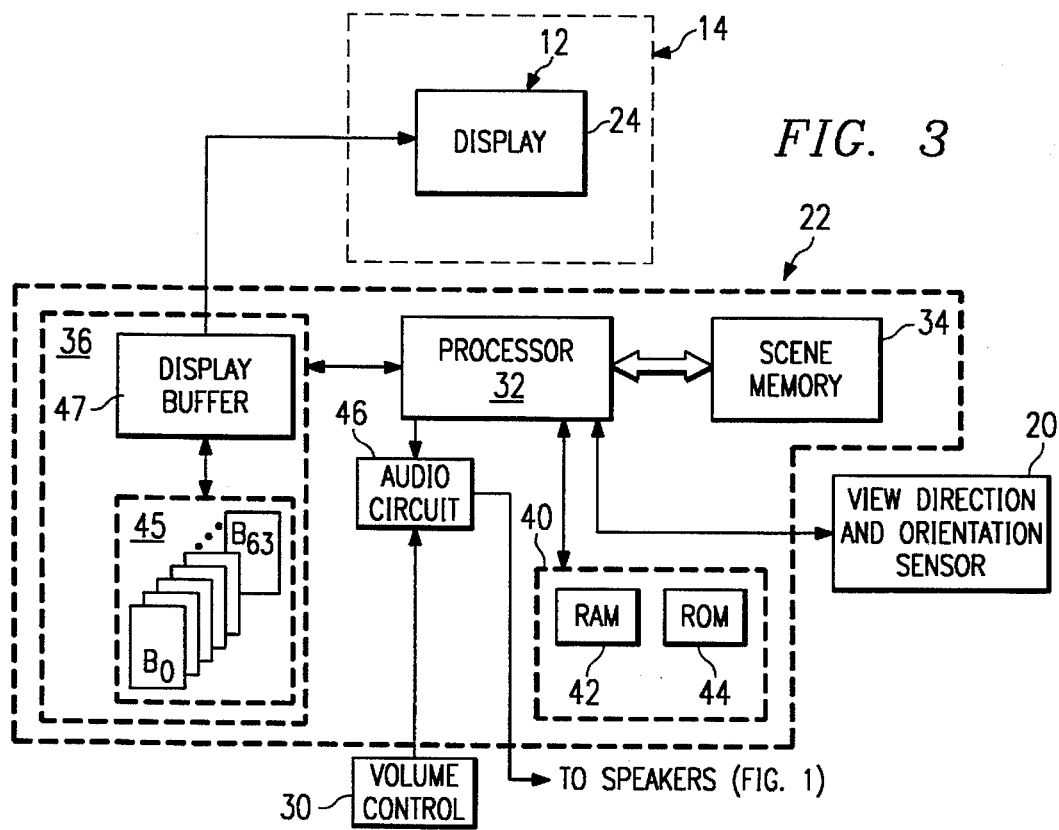
FIG. 3 is a schematic diagram of the circuitry associated with the display system of FIG. 1.

FIG. 3 is a schematic diagram of processing circuitry 22, which includes a processor 32. Processor 32 may be a TMS320C80 Multimedia Video Processor (MVP), which is manufactured by Texas Instruments Incorporated. Processor 32 communicates with sensor 20, a scene data memory 34, a view memory 36, and a program memory 40. Memory 40 may include a random access memory (RAM) 42 and a read only memory (ROM) 44. View memory 36 includes a block 45 of pixel-data buffers B0–B63 and a display buffer 47, which may comprise a video random access memory (VRAM) 47. Each buffer B contains pixel data representing a scene section contained within a corresponding segment S. However, each buffer B is temporarily associated with a particular segment S. For example, at one point in time, B0 may contain pixel data representing the scene section within S5, and at another time B0 may contain pixel data representing the scene section within S33. Circuit 22 may also include an audio circuit 46 for driving the speakers in head band 18 (FIG. 1).

In operation, processor 32 maintains in memory 36 the pixel data that represent the scene sections within region 14. For scene sections that are common to the new view 12 and original region 14, processor 32 merely couples the appropriate pixel data from memory 36 to update view 12 on display 24. In contrast, many existing systems often calculate pixel data that represent scene sections in the new view that were not within the original view. Thus, system 10 expands the area of scene 16 within which the user can shift her gaze but still avoid calculation of new pixel data.

When the user shifts her gaze, processor 32 calculates the coordinates of the new view 12 and provides the proper pixel data to screen 24 via memory 36. Sensor 20 provides a signal to processor 32 that indicates or provides data from which processor 32 can calculate the direction and orientation of the user's gaze. Processor 32 uses this gaze direction and orientation information to compute the coordinates of new view 12. Then, processor 32 uses the view coordinates to identify and, if necessary, calculate the appropriate pixel data for display on screen 24 as view 12.

In a different embodiment such as, for example, a flight simulator, scene 16 may simulate movement of the user, such as in a direction normal to the plane of view 12. In that situation, processor 32 continually updates the pixel data stored in memory 36 to reflect this movement. Furthermore, the fewer objects within region 14 that move independently of the viewer or her gaze (such as, for example, a walking dog), the faster processor 32 can update the pixel data stored within memory 36, and the more realistic circuitry 22 can render view 12 and the transition of the user's gaze from one view to another.

Figure 4:
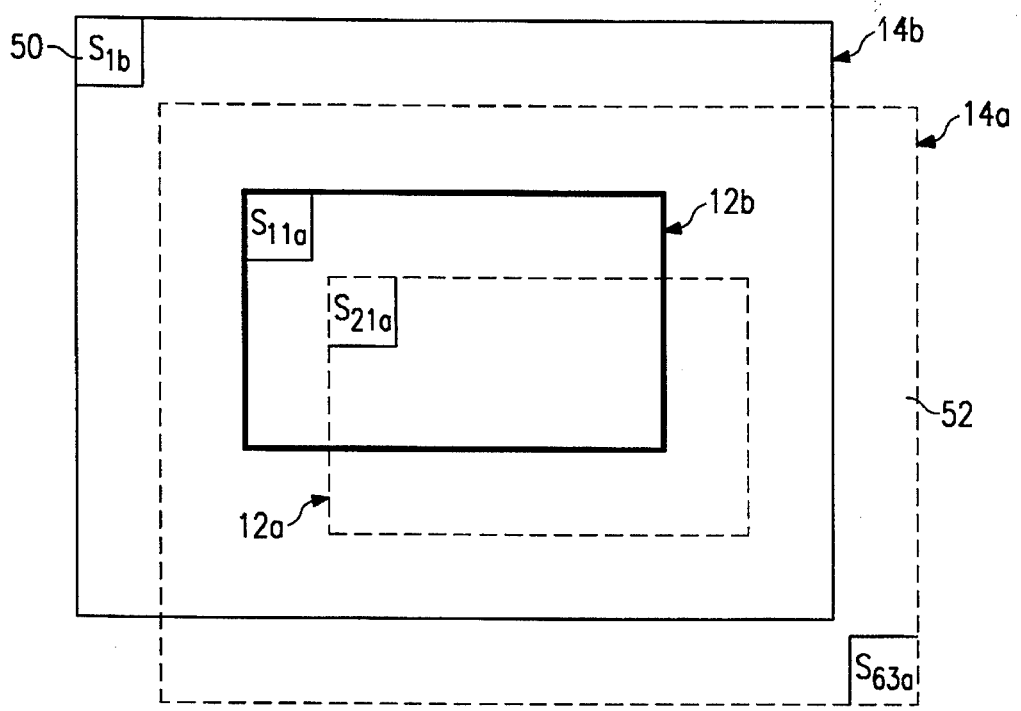
FIG. 4 illustrates a transition of the view and region of FIG. 2 caused by a shift in the direction of the user's gaze.

FIG. 4 illustrates an example of a shift in the direction of the user's gaze, where the new view 12b remains entirely within original region 14a. Because new view 12b is within original region 14a, processor 32 can update screen 24 with existing pixel data from buffers B. As shown, the user has redirected her gaze diagonally to the upper left to transition from original view 12a to new view 12b. Because all the pixel data representing the scene sections within region 14a are stored in buffers B, processor 34 merely provides to display buffer 47 the pixel data stored in the buffers B corresponding to the scene sections within segments S11a–S15a, S20a–S24a, and S29a–S33a, which are contained within new view 12b. For example, if buffer B6 contains pixel data representing the scene section within S11a, processor 32 couples the B6 pixel data to display buffer 47 so that screen 24 displays the B6 pixel data in its upper left corner. Thus, processor 32 can update display buffer 47 rapidly enough to simulate a real view transition because it does not need to calculate new pixel data, but only has to retrieve existing pixel data from the appropriate buffers B.

In another aspect of the invention, new view 12b may include only a portion of one or more segments S along its outer edge. Processor 32 may perform an interpolation algorithm to determine if the greater portion of each such segment lies within or outside of view 12b. If the greater portion lies within view 12b, processor 32 includes the whole segment within view 12b; if the greater portion lies outside view 12b, then processor 32 excludes the whole segment from view 12b. Consequently, this interpolation aligns view 12b with the segments S within region 14a. Although such an interpolation may cause view 12a to "jump" to view 12b in increments or steps, segments S can be chosen small enough to reduce or eliminate the user's perception of these jumps. However, the smaller the segment size, the more buffers B will be required to accommodate the increased number of segments S.

Referring again to FIG. 4, once processor 32 updates screen 24 with the new-view 12b pixel data, it updates buffers B to construct new region 14b. First, processor 32 computes the coordinates of new region 14b so that new view 12b is centered therein. From scene data stored in scene memory 34, processor 34 next calculates new pixel data representing the scene sections within the segments S that constitute section 50 of new region 14b. Because pixel data stored in buffers B that correspond to section 52 of original region 14a are obsolete, processor 34 overwrites these buffers with this new pixel data. Furthermore, because each segments S is only temporarily associated with a particular buffer B, and because processor 32 maintains in memory 40 a record that indicates which buffers B correspond to which segments S at any given time, processor 32 is not required to transfer from one buffer to another pixel data for scene sections common to regions 14a and 14b. Processor 32 merely updates the record to reflect that segments S now contain different sections of scene 16, which thus correspond to different buffers B.

For example, assume that buffer B10 contains pixel data representing the scene section within segment S63a. Processor 32 first calculates pixel data for the scene section within segment S1b. Because the scene section within S63a is not within new region 14b, processor 32 may overwrite B10 with this newly-calculated pixel data representing the scene section within S16. Thus, processor 32 only needs to calculate pixel data for sections of scene 16 that are in new region 14b but not in original region 14a. The remaining pixel data representing the scene 16 sections that are in both regions 14a and 14b do not have to be recalculated.

Still referring to FIG. 4, in yet another aspect of the invention, new view 12b is partially or totally outside of original region 14a. In that situation, processor 32 first provides to screen 24 from the appropriate buffers B pixel data representing the scene sections within new view 12b that are also in original region 14a. Next, processor 32 calculates from the scene data the pixel data representing the scene sections of new view 12b that are not in original region 14a. Processor 34 then provides this calculated pixel data to screen 24 via display buffer 47, and as described above, constructs new region 14b around new view 12b. Although it is possible to perceive an unrealistic delay, region 14 can be made large enough so that any such view movements are significant enough that the user's eyes require an adjustment period long enough to reduce or eliminate the perceived update delay of system 10.

Still referring to FIG. 4, in yet another aspect of the invention, processor 32 may maintain view 12 uncentered within region 14 for a gaze sweep, which is a gaze shift in a single direction where the movement of the gaze is of a duration that exceeds a predetermined threshold value. When processor 32 detects a gaze sweep, it creates a leading edge (or edges) that is wider than a trailing edge or edges (with respect to the direction of the gaze sweep) of region 14 relative to view 12. For example, referring to FIG. 2 in conjunction with the above-described horizontal gaze shift of FIG. 4, the leading edges are the top and left edges of region 14, and the trailing edges are the bottom and right edges of region 14. In that example, the leading edges may be three segments S thick, and the trailing edges one segment S thick. That is, during the gaze sweep, processor 32 maintains region 14 such that view 12 includes segments S31-35, S40-44, and S49-53. This arrangement allows processor 32 to realistically update display 24 even if the speed at which the user is sweeping her gaze momentarily increases. Typically, processor 32 maintains region 14 with a trailing edge or edges having a thickness of at least one segment S to allow realistic updates of display 24, when the user interrupts or ends her gaze sweep to shift her gaze toward the trailing edge or edges.

Figure 5:
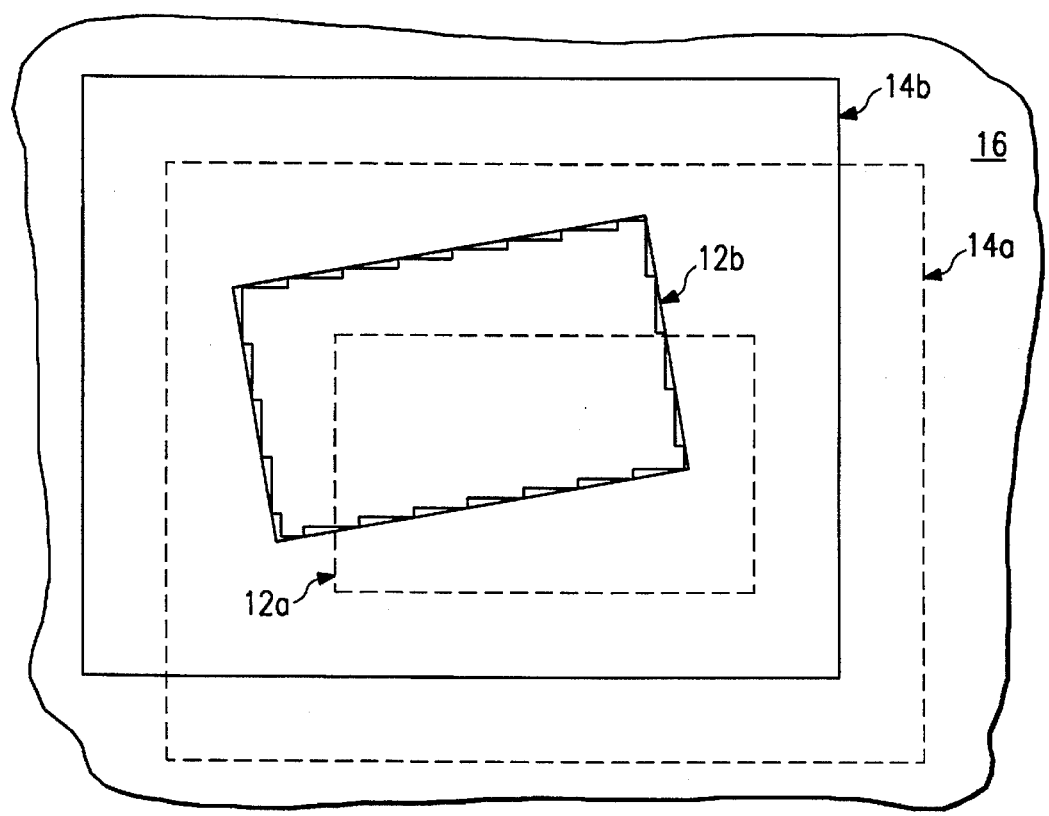
FIG. 5 illustrates a transition of the view and region of FIG. 2 caused by a shift in the direction and orientation of the user's gaze.

FIG. 5 illustrates an example of a shift in both the direction and orientation of the user's gaze where new view 12b remains within original region 14a. As shown, using one interpolation method, processor 32 provides to display 24 pixel data only for the scene sections of the segments S that are entirely within new view 12b. This interpolation may give the outer edge of new view 12b a somewhat jagged appearance. However, as discussed above with respect to FIG. 4, segments S can be chosen small enough to reduce or eliminate the user's perception of such a jagged edge. An example of an interpolation method that can be used herein is described in the Appendix below.

Processor 32 generates new region 14b so that new view 12b is substantially centered therein. However, because processor 32 would have to reorient all segments S and rewrite all buffers B before updating original view 12a to new view 12b, processor 32 typically does not generate new region 14b with the same orientation as new view 12b. Such reorientation and rewriting would often defeat the increase realized in view-transitioning speed and other advantages provided by buffers B and region 14.

In yet another aspect of the invention, processor 32 may rotate region 14b ninety degrees from region 14a, where new view 12b is rotated more than forty-five degrees from view 12a.

Figure 6:
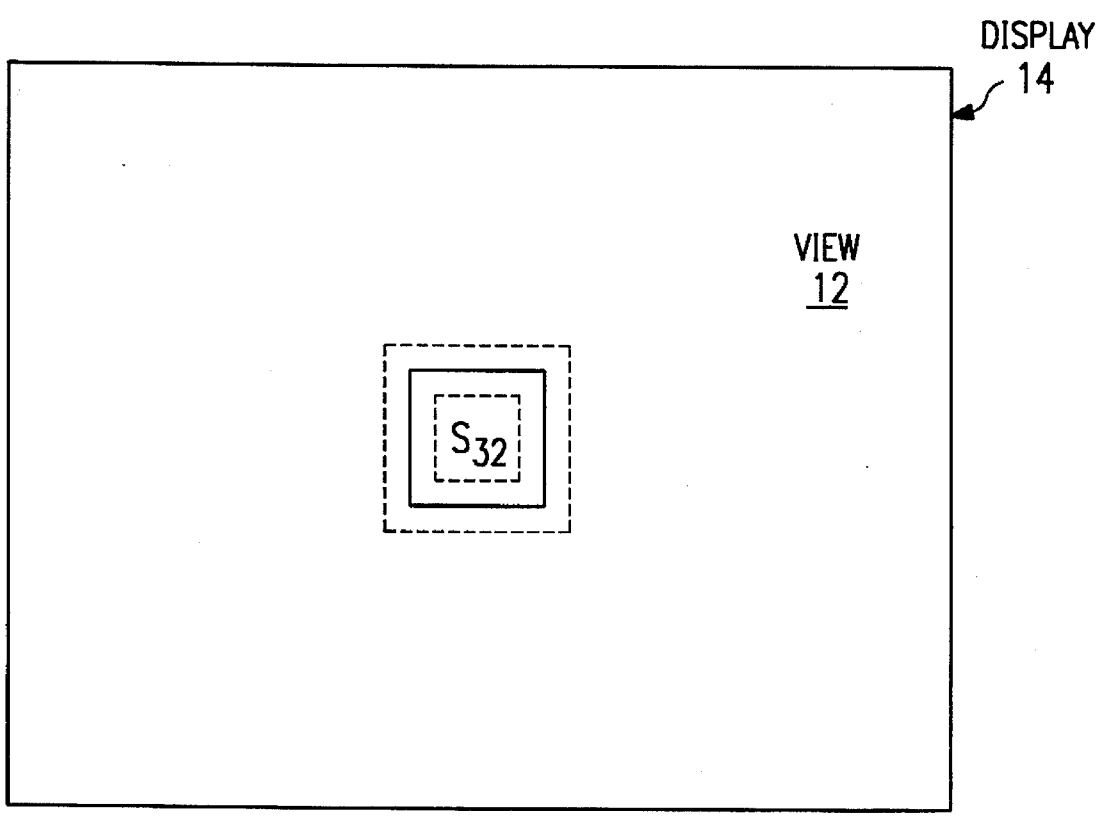
FIG. 6 illustrates a simulation of a movement by a user in a direction normal to the view of FIG. 2.

Referring to FIG. 6, in still another aspect of the invention, processor 32 may execute an algorithm that can simulate the movement of the user in a direction normal to view 12 without updating the pixel data stored in memory 36. As shown, processor 32 changes the size of segments S as perceived by the user, making them smaller to simulate movement away from view 12, and making them larger to simulate movement toward view 12. For clarity, only segment S32 is shown. The dashed lines represent some of the other perceived dimensions that S32 may have. When segments S are made smaller, more segments S are required to fill the entirety of display 24 with view 12. Alternatively, if view 12 is maintained with a constant number of segments S, processor 32 varies the area of display 12 that view 12 occupies. Conversely, as processor 32 enlarges them, the number of segments S required to fill the entirety of display 24 decreases. Theoretically, processor 32 could enlarge segments S such that S32 occupies virtually the entirety of display 24. However, the resolution of the objects within segments S may limit the amount processor 32 can magnify segments S without updating the pixel data stored in memory 36.

Although the present invention and its advantages have been described in detail, it should be understood that various changes, substitutions and alterations can be made therein without departing from the spirit and scope of the invention as defined by the appended claims.

APPENDIX

Excessive video camera movement can cause a portion of a recorded scene to be lost. For example, if a mountain within a scene is being recorded, a sudden downward movement of the video camera can cause the top portion of the mountain to be lopped off or lost from the scene. If such a portion of a scene has been lost, then interpolation can be performed by processing circuitry 22 (in FIGS. 1 and 3) to provide the "lost" data that represent the top portion of the mountain. Essentially, the interpolation method can be used to fill in "missing" scene information by using prior or subsequent scene data.

More precisely, by a process of retrieving and comparing stored video frame data, processing circuitry 22 can determine whether or not prior or subsequent frame data has been stored and is thus available to fill in the "missing" portion of a scene. Because processing circuitry 22 can store several frames of video data at a time, it is possible to fill in a portion of a frame with data retrieved from other frames (i.e., either prior or subsequent frames). For example, it is possible to fill in the top of the above-described mountain that is "missing" from one video frame, with a previously recorded and stored frame's data that includes the data representing the top of the mountain. Alternatively, it is also possible to fill in the "missing" top of the mountain with a subsequently recorded and stored frame's data, if that data includes the top of the mountain. In this manner, "missing" scene information can be filled in by the processing circuitry using interpolation.

What is claimed is:

1. A method for simulating one or more views based on a user's perspective, comprising the steps of:

storing scene data in a scene memory;

determining a first view based on view direction and orientation;

calculating pixel data from a portion of said scene data corresponding to said first view and a first border surrounding said first view, wherein said pixel data comprises first view pixel data and first border pixel data;

storing said pixel data in a pixel memory;

displaying a first image using said first view pixel data from said pixel memory on a display;

determining a second view;

displaying a second image using a second view pixel data corresponding to said second view from said pixel memory without recalculating said pixel data, wherein said second view pixel data comprises portions of said first view pixel data and said first border pixel data;

after displaying said second view pixel data, determining a second border surrounding said second view and calculating portions of a second border pixel data not found in said first view pixel data or first border pixel data from said scene data; and storing said portions of said second border pixel data in said pixel memory.

2. The method of claim 1, further comprising the step of sensing the direction and orientation of said user's gaze prior to each of said steps of determining said first view and determining said second view.

3. The method of claim 1, wherein said pixel data represents a three-dimensional segments of said scene.

4. The method of claim 1, wherein said three-dimensional segments each have a square cross-section.

5. The method of claim 1, wherein said scene data comprises a plurality of three-dimensional scene segments.

6. The method of claim 5, wherein the step of storing said pixel data comprises the step of storing said pixel data in a plurality of buffers, wherein each buffer contains pixel data corresponding to one of said plurality of three-dimensional scene segments.

7. The method of claim 1, wherein the step of calculating a second border pixel data comprises the steps of:

computing coordinates of said second border so that said second view is centered within said second border; and calculating portions of said second border pixel data not included in said first view pixel data or said first border pixel data using said scene data and said coordinates.

8. The method of claim 7, wherein portions of said first view pixel data and said first border pixel data that are not included in said second view pixel data and second border pixel data are overwritten with portions of said second border pixel data not included in said first view pixel data and first border pixel data.

9. The method of claim 1, wherein the step of displaying said second image further comprises the steps of:

determining whether all of said second view pixel data is stored in said pixel memory; and if not:

displaying a portion of said second image corresponding to portions of said second view pixel data that are stored in said pixel memory;

calculating portions of said second view pixel data not stored in pixel memory; and displaying and storing said portions of said second view pixel data not previously stored in pixel memory.

10. The method of claim 1, wherein said displaying steps comprise:

interpolating said pixel data stored in said pixel memory to achieve a shift in orientation and displaying said interpolated pixel data without changing said pixel data stored in said pixel memory.

11. The method of claim 1, wherein said displaying steps comprise:

adjusting the size of the displayed image relative to the pixel data to simulate movement without changing said pixel data stored in said pixel memory.

* * * * *